US006173565B1

United States Patent
Cassady et al.

(10) Patent No.: US 6,173,565 B1
(45) Date of Patent: *Jan. 16, 2001

(54) THREE AXIS PULSED PLASMA THRUSTER WITH ANGLED CATHODE AND ANODE STRIP LINES

(75) Inventors: R. Joseph Cassady, Bellevue; Roger M. Myers, Woodinville, both of WA (US); Robert D. Osborne, San Jose, CA (US)

(73) Assignee: Primex Technologies, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/058,314

(22) Filed: Apr. 9, 1998

Related U.S. Application Data

(60) Provisional application No. 60/076,435, filed on Mar. 2, 1998.

(51) Int. Cl.[7] .................................................. B63H 11/00
(52) U.S. Cl. ........................... 60/203.1; 60/230; 244/169
(58) Field of Search .................................. 60/202, 203.1, 60/230; 244/169, 172; 313/231.31; 219/121.37, 121.52, 121.54

(56) References Cited

U.S. PATENT DOCUMENTS

| | | | |
|---|---|---|---|
| 3,447,322 | * | 6/1969 | Mastrup ............................... 60/203.1 |
| 3,555,823 | * | 1/1971 | Guman ................................. 60/203.1 |
| 3,636,709 | * | 1/1972 | La Rocca ............................. 60/203.1 |
| 4,589,398 | * | 5/1986 | Pate et al. ............................... 123/596 |
| 4,733,530 | | 3/1988 | Beattie et al. ............................ 60/202 |
| 4,821,509 | * | 4/1989 | Burton et al. ............................ 60/203.1 |
| 4,848,706 | | 7/1989 | Garg et al. ............................. 244/169 |
| 4,967,637 | | 11/1990 | Loffler et al. .......................... 60/203.1 |
| 5,207,760 | | 5/1993 | Dailey et al. ............................ 60/202 |
| 5,335,179 | * | 8/1994 | Boka et al. ............................. 244/169 |
| 5,339,623 | | 8/1994 | Smith ................................... 60/203.1 |
| 5,352,861 | | 10/1994 | Steigerwald et al. ............. 219/121.54 |
| 5,359,180 | * | 10/1994 | Park et al. ............................. 60/203.1 |
| 5,395,076 | * | 3/1995 | Lichtin et al. .......................... 244/169 |
| 5,425,231 | | 6/1995 | Burton .................................. 60/203.1 |
| 5,439,191 | | 8/1995 | Nichols et al. ........................ 244/169 |
| 5,806,804 | * | 9/1998 | Goodzeit et al. ...................... 244/169 |
| 5,924,278 | * | 7/1999 | Burton et al. ......................... 60/203.1 |

FOREIGN PATENT DOCUMENTS 2 262 777  *  6/1993  (GB) .

* cited by examiner

Primary Examiner—Ted Kim
(74) Attorney, Agent, or Firm—Wiggins & Dana; Gregory S. Rosenblatt

(57) ABSTRACT

A spacecraft attitude and altitude control system utilizes sets of three pulsed plasma thrusters connected to a single controller. The single controller controls the operation of each thruster in the set. The control of a set of three thrusters in the set makes it possible to provide a component of thrust along any one of three desired axes. This configuration reduces the total weight of a spacecraft since only one controller and its associated electronics is required for each set of thrusters rather than a controller for each thruster. The thrusters are positioned about the spacecraft such that the effect of the thrusters is balanced.

15 Claims, 10 Drawing Sheets

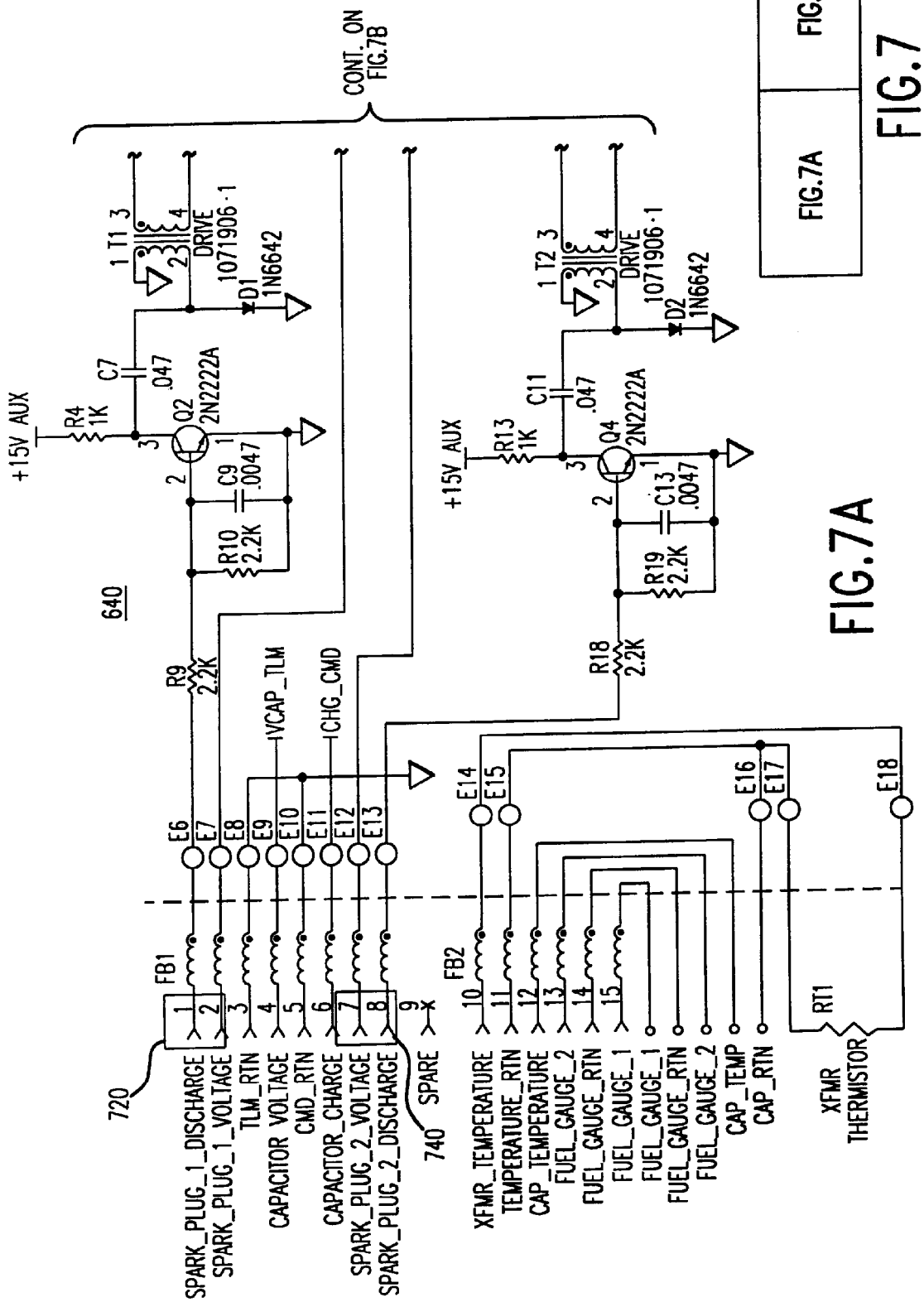

THREE AXIS PULSED PLASMA THRUSTER WITH ANGLED CATHODE AND ANODE STRIP LINES

This is a continuation application of provisional application U.S. Ser. No. 60/076,435, filed Mar. 2, 1998 which is incorporated in its entirety herein.

The U.S. Government has a paid-up license in this invention and the right, in limited circumstances, to require the patent owner to license others on reasonable terms as provided for by the terms of contract number NAS3-27570 awarded by NASA.

BACKGROUND OF THE INVENTION

1. Field of the Invention

This invention relates to pulsed plasma thrusters for spontaneously adjusting the attitude or altitude of a spacecraft. More particularly, this invention relates to a single controller that controls the magnitude and direction of thrust in a thruster set.

2. Description of the Art

Present spacecraft attitude and altitude control systems use a combination of rotating wheels with either thrusters or magnetic torque rods to compensate for changes in wheel speed when the spacecraft attitude is adjusted. The wheels are used to absorb angular momentum or to generate rotation of the spacecraft in response to disturbance torque imparted to the spacecraft. Wheels have been used because a system utilizing only thrusters was considered to be limited by the amount of propellant that may be carried on board.

Thrusters have not been used to their fullest potential because even a very small control thrust generated by typical thrusters is too large and such a thrust caused the spacecraft to be overwhelmed. This required compensation measures to correct the motion of the spacecraft. This problem in spacecraft control is due to the fact that many designs provide thrust in two directions or alternatively, cant the electrode to provide thrust at an angle. These designs are not desirable since thrust is provided in two components and thus, requires firing a second thruster to compensate for any undesired torque or translations produced as a result of the components of the first thrust.

U.S. Pat. No. 4,848,706 (Garg et al.) discloses a spacecraft attitude control system using coupled thrusters. The thrusters provide cross coupling torque so that as one thruster is fired; a second thruster is fired thereby providing a balancing force.

U.S. Pat. No. 5,207,760 (Dailey et al.) discloses a multi-megawatt pulsed inductive thruster. A gas is discharged against an inductor. Each thruster has an associated capacitor to discharge by a trigger generator after a puff of propellant reaches an inductor.

U.S. Pat. No. 5,339,623 (Smith) discloses singly fueled multiple thrusters simultaneously energized by a common power supply. This technique allows a single power supply for multiple thrusters but does not switch from one thruster to a second thruster.

U.S. Pat. No. 5,439,191 (Nichols et al.) discloses a railgun thruster, which provides attitude control via three perpendicular axes. This patent discloses that each thruster has an associated power source.

Thus, there is a need for an improved thruster that provides a single control unit and power source for a plurality of thrusters such that the proper magnitude of thrust is provided to maintain the desired direction of the spacecraft. This type of thruster would eliminate the need for additional thrusters to be fired.

BRIEF DESCRIPTION OF THE INVENTION

Accordingly, it is an object of the present invention to provide a spacecraft control system that adjusts the attitude and/or altitude of a spacecraft such that the orbit of the spacecraft is not disturbed.

It is also an object of the invention that a single controller controls sets of thrusters of a spacecraft.

A third object of the invention is the placement of thruster sets about a spacecraft to provide control in all three orthogonal directions.

It is a feature of this invention that an attitude control system includes sets of three axial pulsed plasma thrusters, coupled to a single controller that selectively provides thrust along a desired axis. A low inductance stripline couples the controller to a set of discharge electrodes on each axial thruster.

DETAILED DESCRIPTION OF THE INVENTION

Thrusters are used to control spacecraft in order to maintain a desired orbit and orientation. The present invention uses a single controller in conjunction with axial thrusters to adjust the attitude and/or altitude of a spacecraft. Three axial thrusters are electronically coupled to a single controller, which determines the direction and magnitude of thruster firing. The three axial thrusters form a thruster set, which may be configured so that there is a thruster in the X-axis, Y-axis and Z-axis. Each axial thruster has discharge electrodes and a propellant bar. The use of a single power source for pulsed plasma thrusters is advantageous because there is a substantial reduction in the cost of manufacture and weight of the device. The inventive configuration eliminates the need to compensate for thrust in an undesired direction because only thrust in a single direction is provided by the single controller and therefore, no undesired thrust components are introduced.

Figure 1:
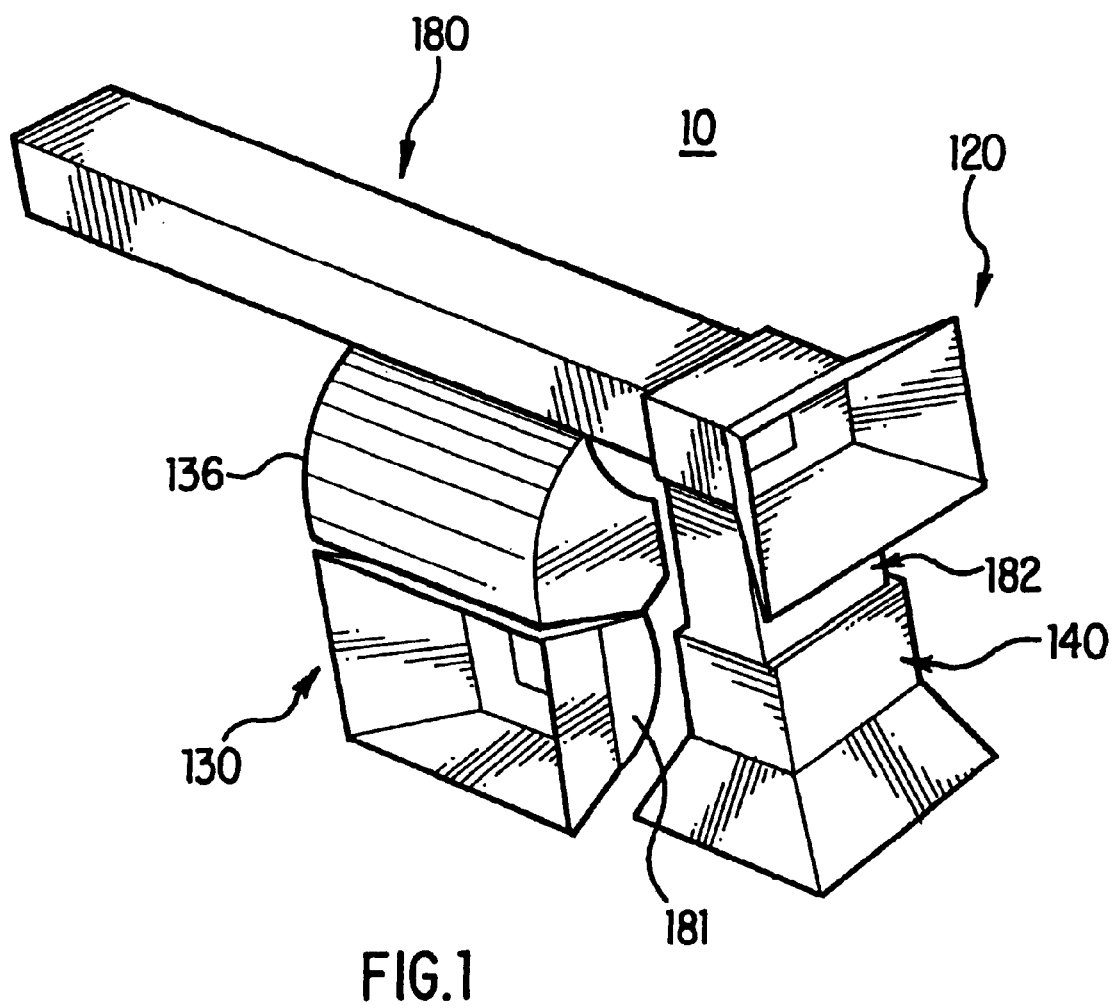
FIG. 1 shows a three axis thruster set.

FIG. 1 shows the three axis thruster set 10 that is comprised of a first axial thruster 120 along the X-axis, a second axial thruster 130 along the Y-axis and a third axial thruster 140 along the Z-axis. Each axial thruster 120, 130 and 140 has a propellant bar associated with it. Propellant bar 180 is associated with the X-axis thruster 120, propellant bar 181 is associated with the Y-axis thruster 130 and propellant bar 182 is associated with the Z-axis thruster 140.

The controller 136 provides a command to a desired axial thruster thereby providing thrust in a specific direction. The controller 136 provides control over all three axial thrusters that make up the thruster set 10.

The controller 136 includes: a capacitor (shown in FIG. 2 as element 138) for energy storage and an on-board power converter, which takes power from the spacecraft in order to charge the capacitor. The capacitor receives power at a low rate, ranging from about 0.01 to 1.0 Watts and more typically approximately a tenth of a Watt per a time interval that ranges between 0.01 and 3 seconds and more typically about 0.25 seconds. The capacitor then discharges the accumulated power in a very short time interval, approximately 1 to 10 microseconds and more typically about 5 microseconds. This rapid discharge provides the necessary high power for accelerating the plasma, thus imparting thrust to the spacecraft.

The controller 136 determines the direction of thrust by a propellant fuel bar. These propellant fuel bars, 180, 181, 182 melt a material such as synthetic resinous fluorine containing polymers, for example polytetrafluoroethylene, causing it to vaporize. The high current discharge then ionizes the vaporized propellant and accelerates it down the electrodes, thereby imparting thrust to the spacecraft.

Figure 2:
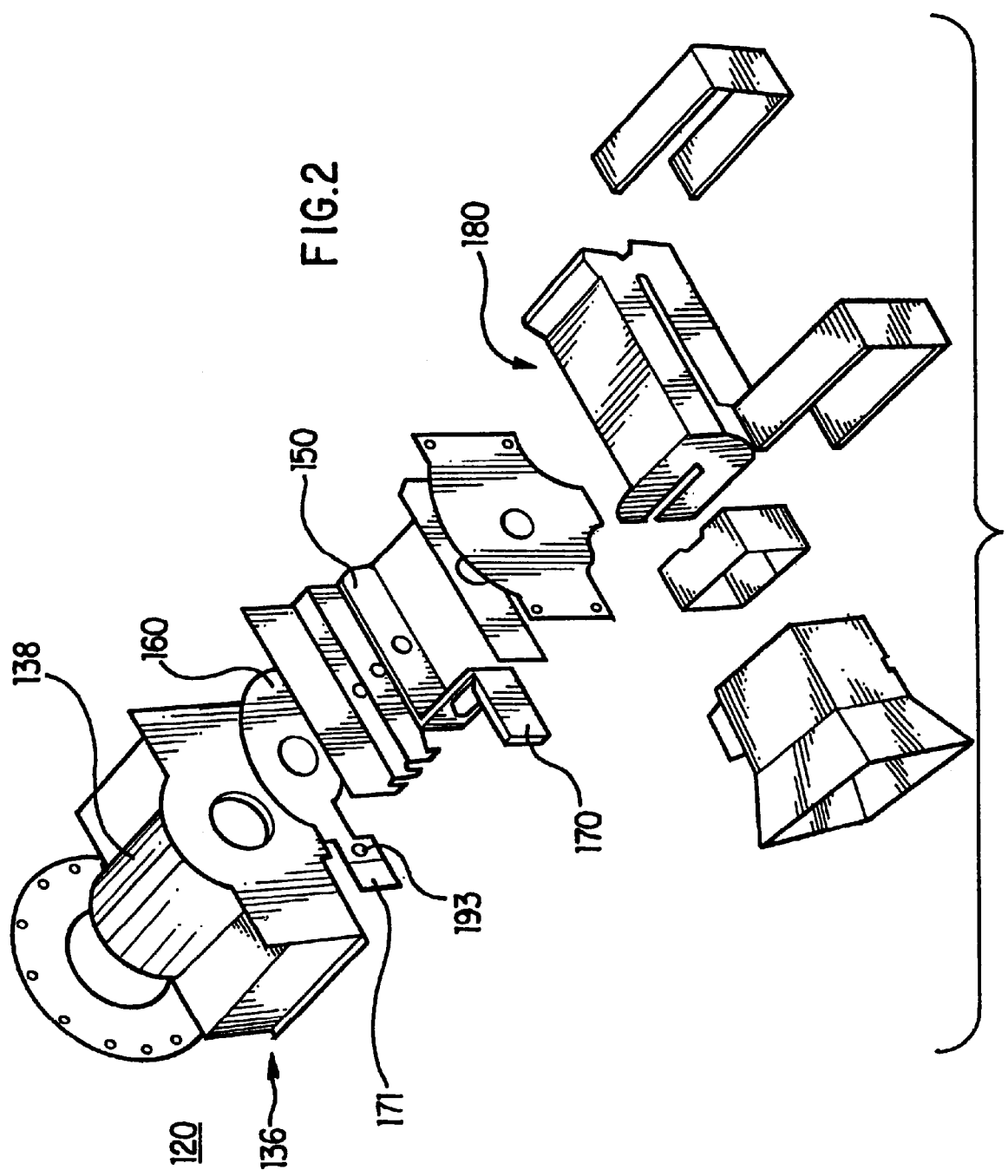
FIG. 2 shows an exploded view of one of the axial thrusters in a three axis thruster set.

As shown in FIG. 2, a single controller 136 and a capacitor 138, are used in conjunction with the present system. The controller 136 takes low voltage power from the spacecraft and provides high voltage outputs to charge an energy storage capacitor 138, and provides a high voltage pulse to fire one of a plurality of sparkplugs. For discussion purposes, only a single axial thruster will be described. Each axial thruster has a single sparkplug associated with it, i.e., sparkplug 193, with axial thruster 120. The energy storage capacitor 138 utilizes anode stripline 150 and cathode stripline 160 for connecting the capacitor 138 to the anode discharge electrode 170; and the cathode discharge electrode 171 and a propellant fuel bar 180. The voltage across the capacitor 138 is the voltage across the electrodes 170, 171 of the X-axis thruster as well as the voltage across the electrodes of the Y-axis and Z-axis thrusters. This is possible because the anode stripline has very low resistance.

The discharge electrodes 170, 171 are associated with X-axial thruster 120. The Y-axial thruster 130 and Z-axial thruster 140 also have associated discharge electrodes (not shown). The anode stripline 150 provides a path for current from the capacitor 138 to the anode discharge electrode 170 when an axial thruster is fired. The anode stripline 150 functions as an extension of the capacitor as well as a high current carrying conductor with a magnitude that ranges between 10,000–40,000 amperes. The cathode stripline 160 is coupled to the capacitor such that a connection between the capacitor 136 and the cathode discharge electrode 171 is provided. The anode and cathode striplines must be insulated to withstand a voltage in excess of 2,000 volts.

The sparkplug 193 has associated electronics in the controller 138 to implement the firing of an associated axial thruster.

Figure 3:
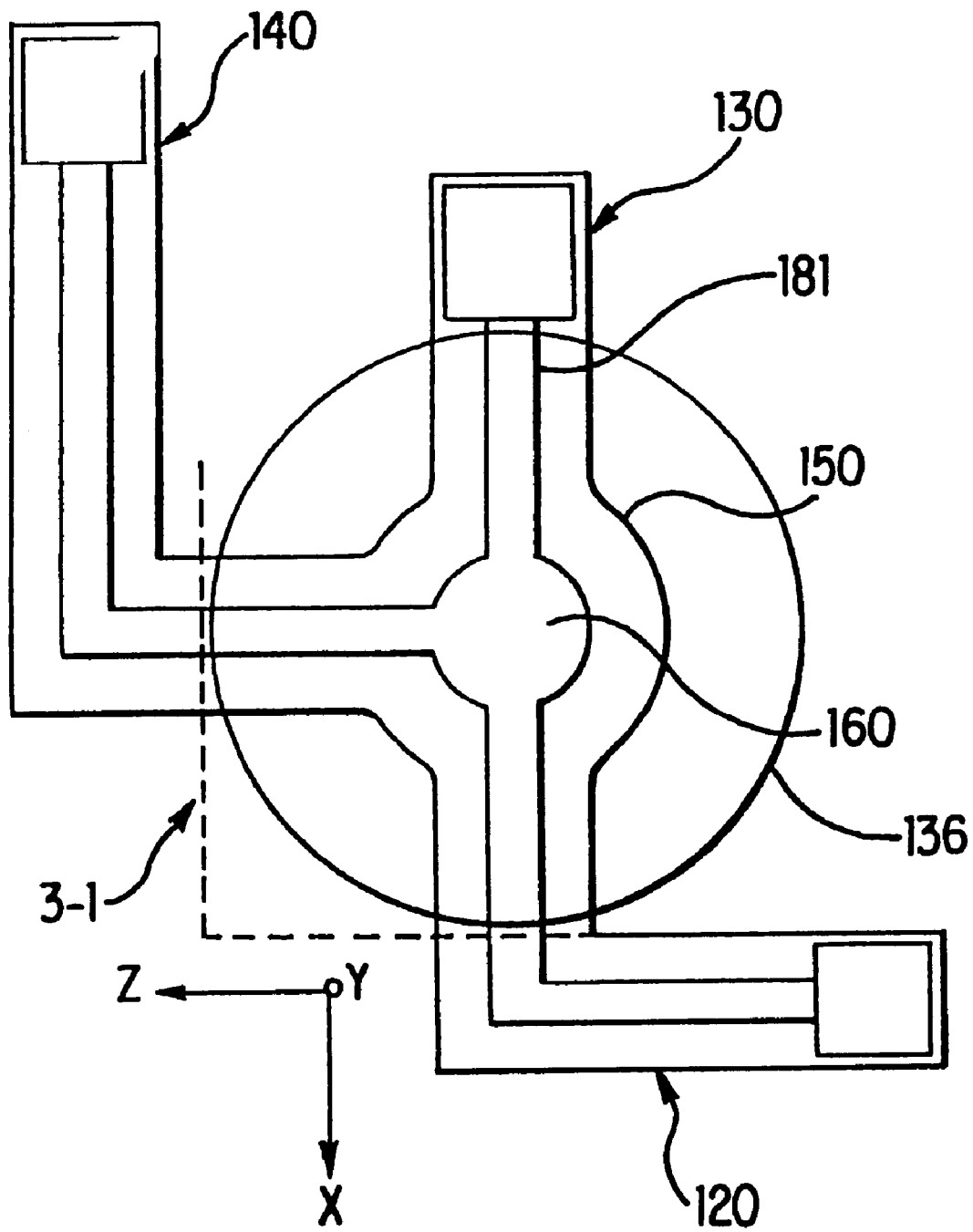
FIG. 3 shows a planar view of the three axis thruster stripline.

As shown in FIG. 3, the controller 136 employs the anode stripline 150 and the cathode stripline 160 to provide a current path from a power source to the electrodes of a particular axial thruster 120, 130 or 140. The axial thrusters are arranged so as to provide thrust in all three orthogonal directions. This requires both the anode stripline 150 and the cathode stripline 160 to be angled 90 degrees at the locations indicated by the dashed line 3-1 in FIG. 3. This eliminates the need for counter-balancing thrusters. Propellant fuel bars provide the required material to produce thrust.

Cathode stripline 160 ranges in length from approximately 8 to 15 inches.

Figure 4:
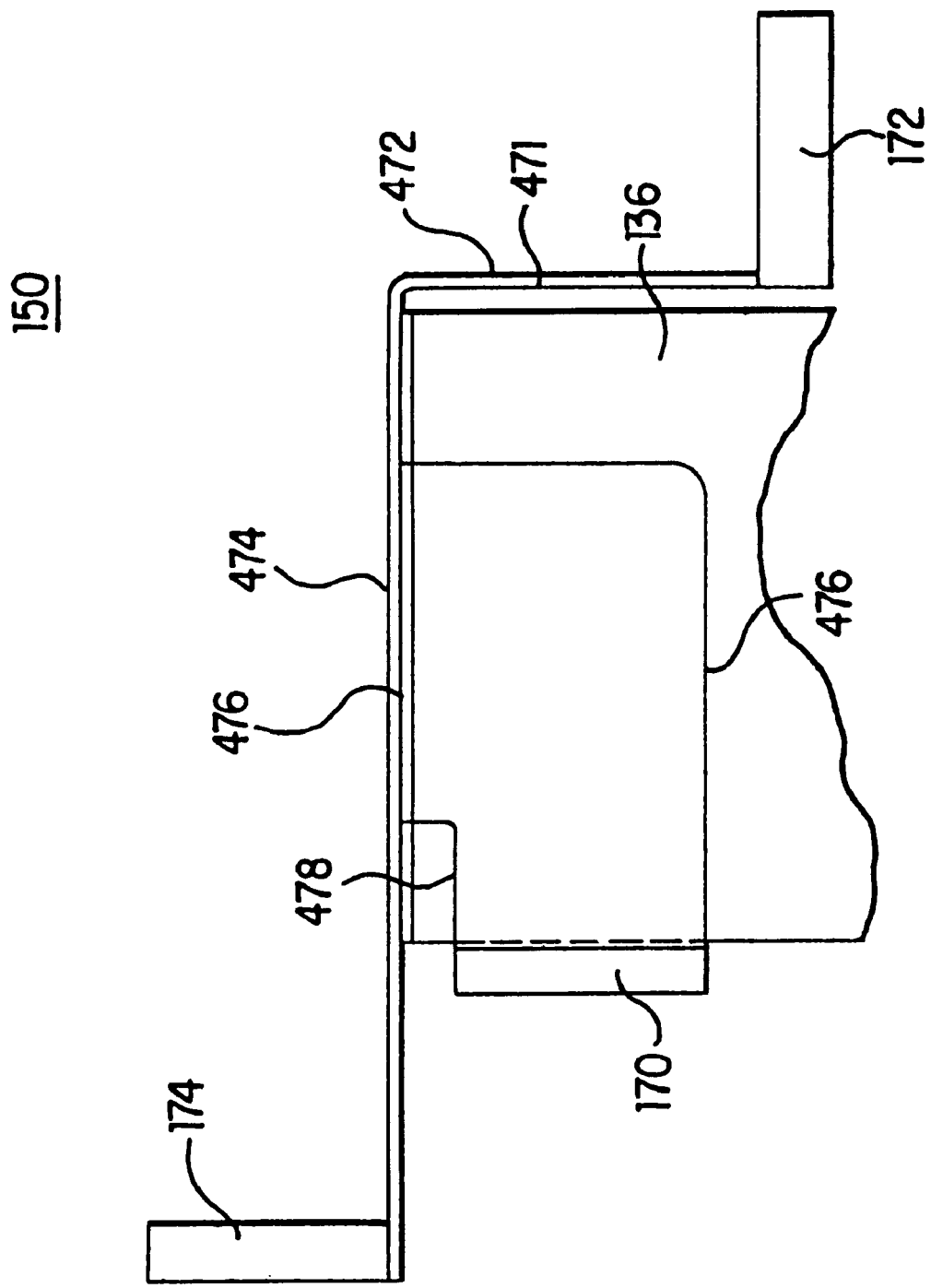
FIG. 4 shows a stripline design for a three axis pulsed plasma thruster that is configured around a cylindrical capacitor.

FIG. 4 shows a side view of the anode stripline 150 for all three thrusters. This anode stripline, which is comprised of a thin copper sheet having very low inductance, has a length of approximately eight to fifteen inches and provides for current conduction between the energy storage capacitor 138 and the discharge electrodes 170, 172, 174 for all three axes. A similar configuration is-employed for the cathode stripline 160. Discharge electrode 170 is the discharge electrode used in conjunction with the X-axial thruster. Discharge electrodes 172 and 174 are used in conjunction with the Y and Z axial thrusters respectively. Discharge electrode 170 has associated thin copper sheets 478 and 476 to provide conduction to discharge electrode 170. In a similar fashion, discharge electrode 172 has associated conductors 471 and 472, and discharge electrode 174 has associated conductors 474 and 476.

Figure 5:
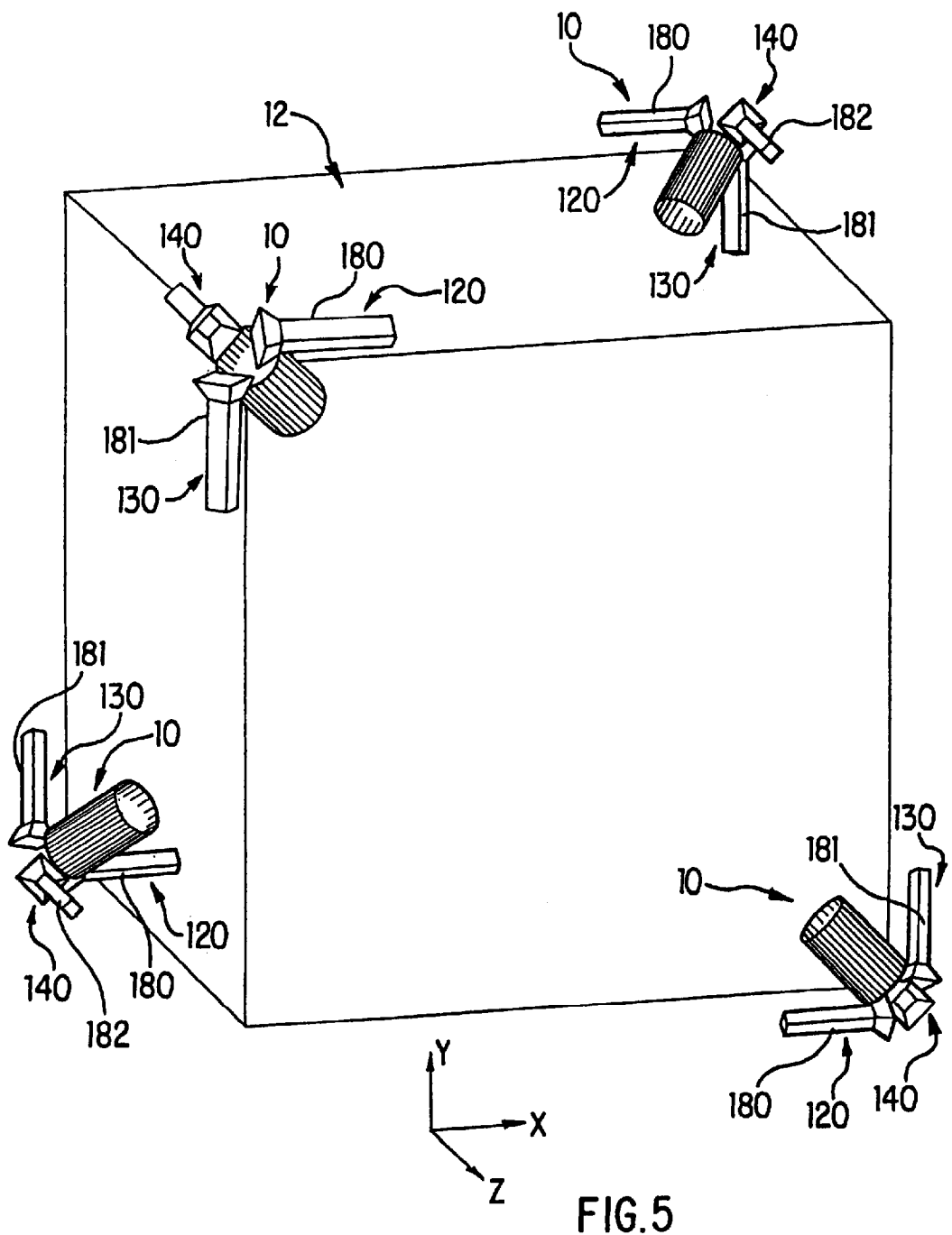
FIG. 5 shows placement of the three axis thruster modules around a spacecraft.

FIG. 5 shows that the propellant bars 180, 181, 182 may be configured to be symmetric around the controller 136 to minimize inductance of the striplines and maintain high efficiency when they are fired. Also, as shown in FIG. 5, the thruster sets 10 may be positioned on a spacecraft 12 such that the orbit of the spacecraft is maintained either through a translation or a rotation maneuver when an axial thruster 120, 130 or 140 is fired. This is a desired configuration since it provides complete stability for the spacecraft with a minimum number of pulsed-plasma thruster units.

Pulsed plasma thrusters overcome the limitation of the amount of propellant that may be carried on board a spacecraft because they achieve high specific impulse through the use of electrical energy. Unlike other electric thrusters, pulsed plasma thrusters are pulsed devices that use an energy storage capacitor that allows operation at a much lower average power level. Pulsed plasma thrusters such as thruster set 10 take in power at a low rate and discharge it very rapidly thereby providing high instantaneous power to produce thrust at a high specific impulse. The specific impulse (Isp) is desired to have a large magnitude for sustained propulsive maneuvering. The specific impulse for these axial thrusts is approximately 1000 sec., which is a measure of the thrust per unit of propellant used. Pulsed plasma thrusters provide very precise impulses that will not overwhelm the spacecraft. The minimum impulse bit (Ibit) typically achievable ranges in magnitude from 50 to 100 $\mu$Ns. This combination of a minimum Ibit and high specific impulse bit provides an efficient thruster for spacecraft maneuvers.

Figure 6A:
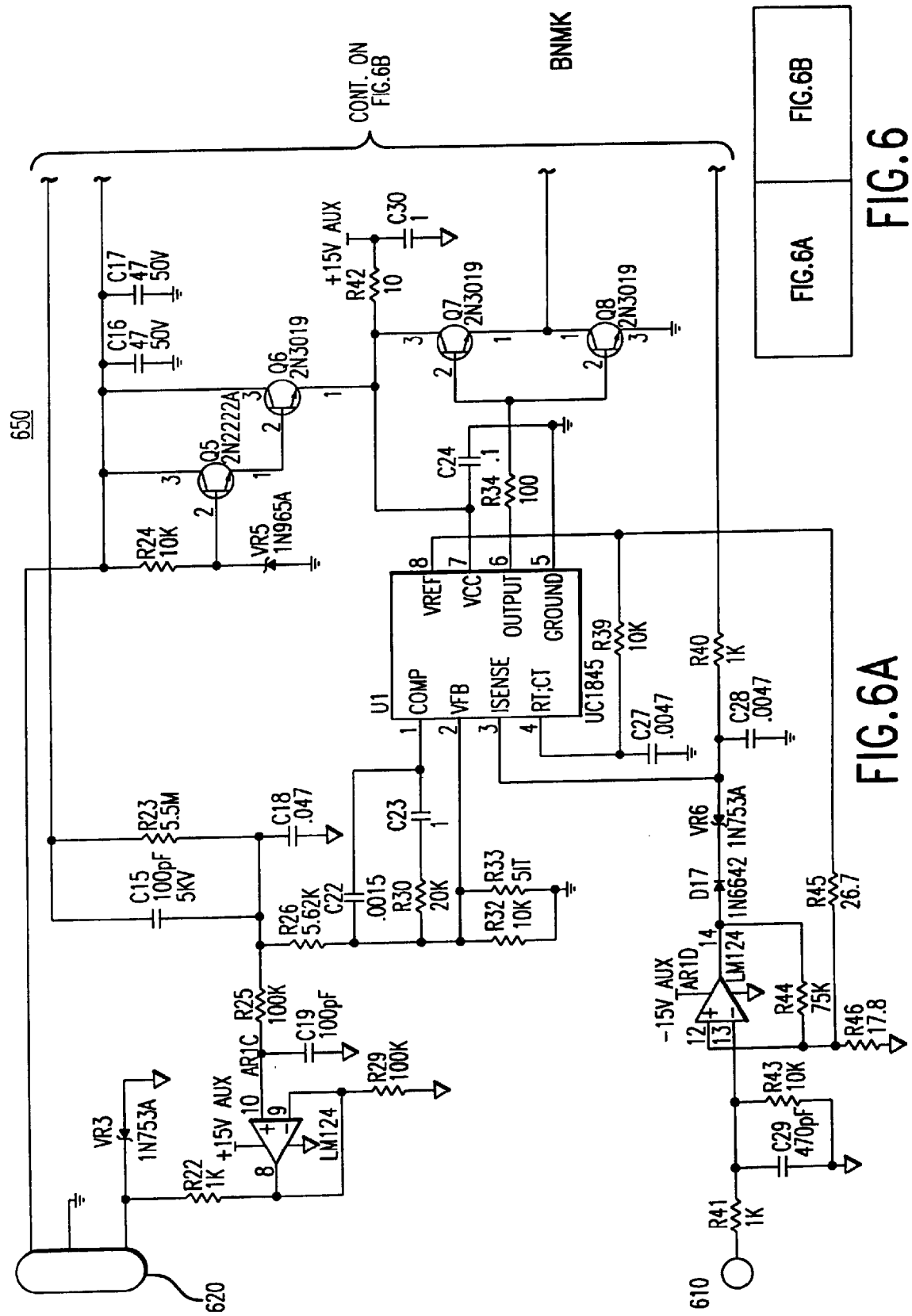
FIG. 6 shows the charging circuitry for a controller.
Figure 6B:
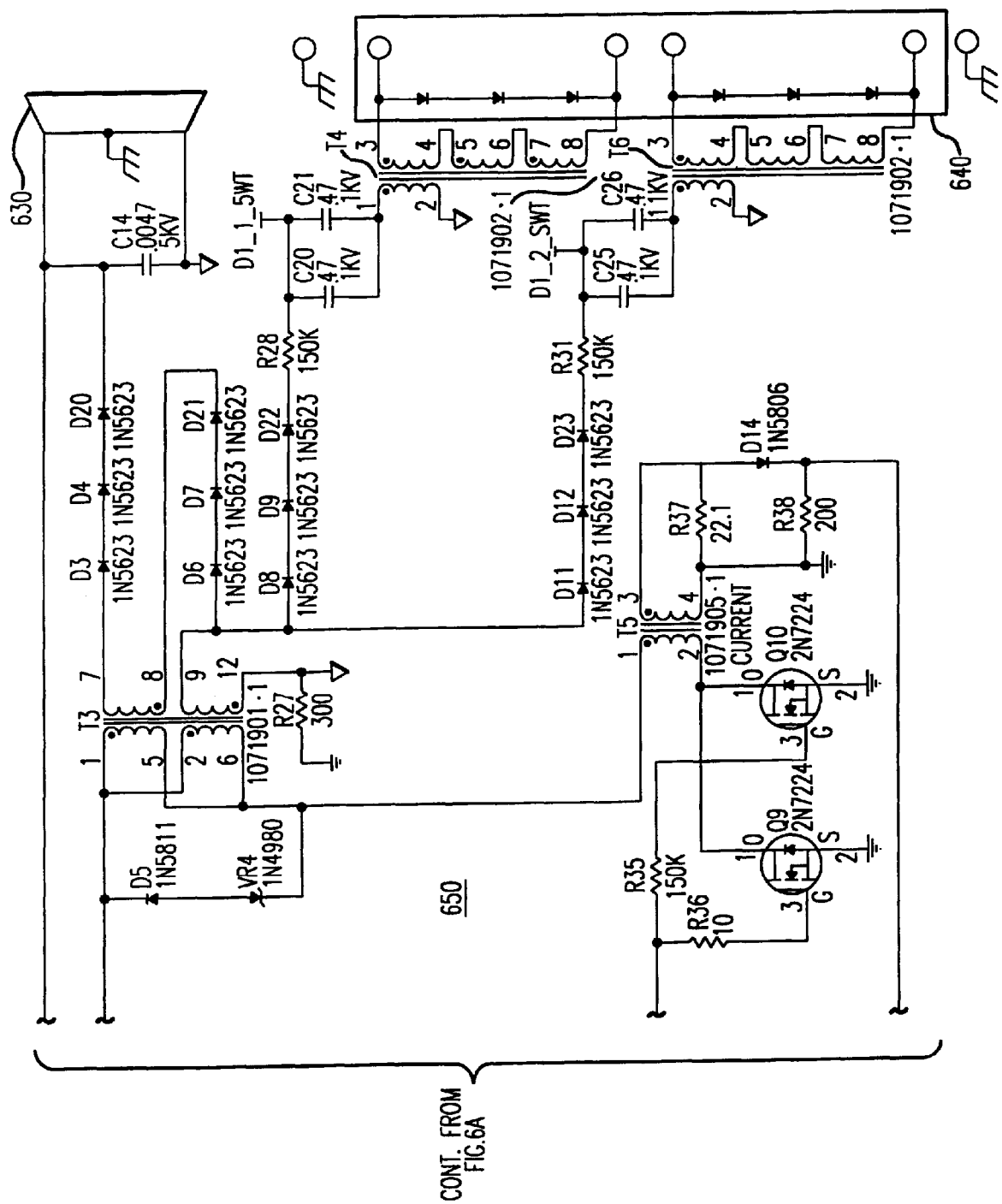

FIG. 6 shows charge conversion circuitry 650 for the controller. Circuit 650 is representative of the circuitry to fire thrusters in the X and Y directional components. Circuitry to provide thrust in the Z component would include similar features. The purpose of circuit 650 is to charge the energy storage capacitor. This is accomplished by receiving a command input at terminal 610 and a low voltage power input from the spacecraft (typically between 20 and 30 volts) at terminal 620. The charge conversion circuit 650 outputs a high voltage across the terminals of the capacitor through terminal 630, thus charging it with stored energy. The conversion circuit 650 also outputs a discharge initiation voltage to initiate firing of a spark plug through output 640. Output 640 is used to fire the spark plug associated with the X-axis thruster and the spark plug associated with the Y-axis thruster.

Figure 7B:
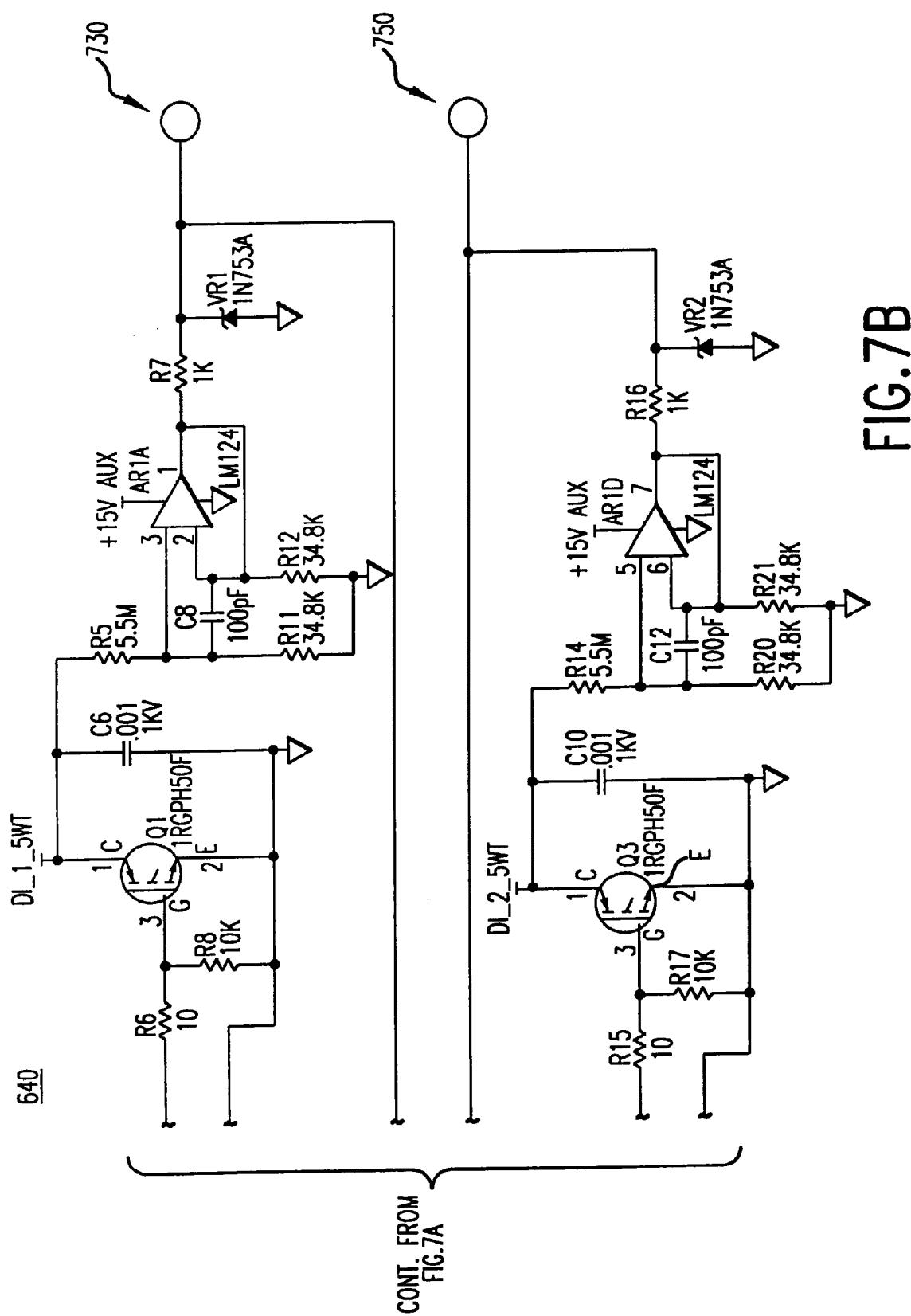
FIG. 7 shows the firing circuitry for the thruster.

FIG. 7 shows details of discharge initiation circuitry 640 to cause spark plugs in the X-axis thruster and Y-axis thruster to fire. The control of the firing of a selected axial thruster (x, y, or z) is accomplished by selecting which sparkplug to fire. This is accomplished via a command signal from the spacecraft. The command to fire the X-axis spark plug is received by input 720 of the discharge initiation circuit 640 and outputs a command to X-axis spark plug at terminal 730. The command to fire the Y-axis spark plug is received by input 740 and outputs a command to the Y-axis spark plug at terminal 750.

Figure 8:
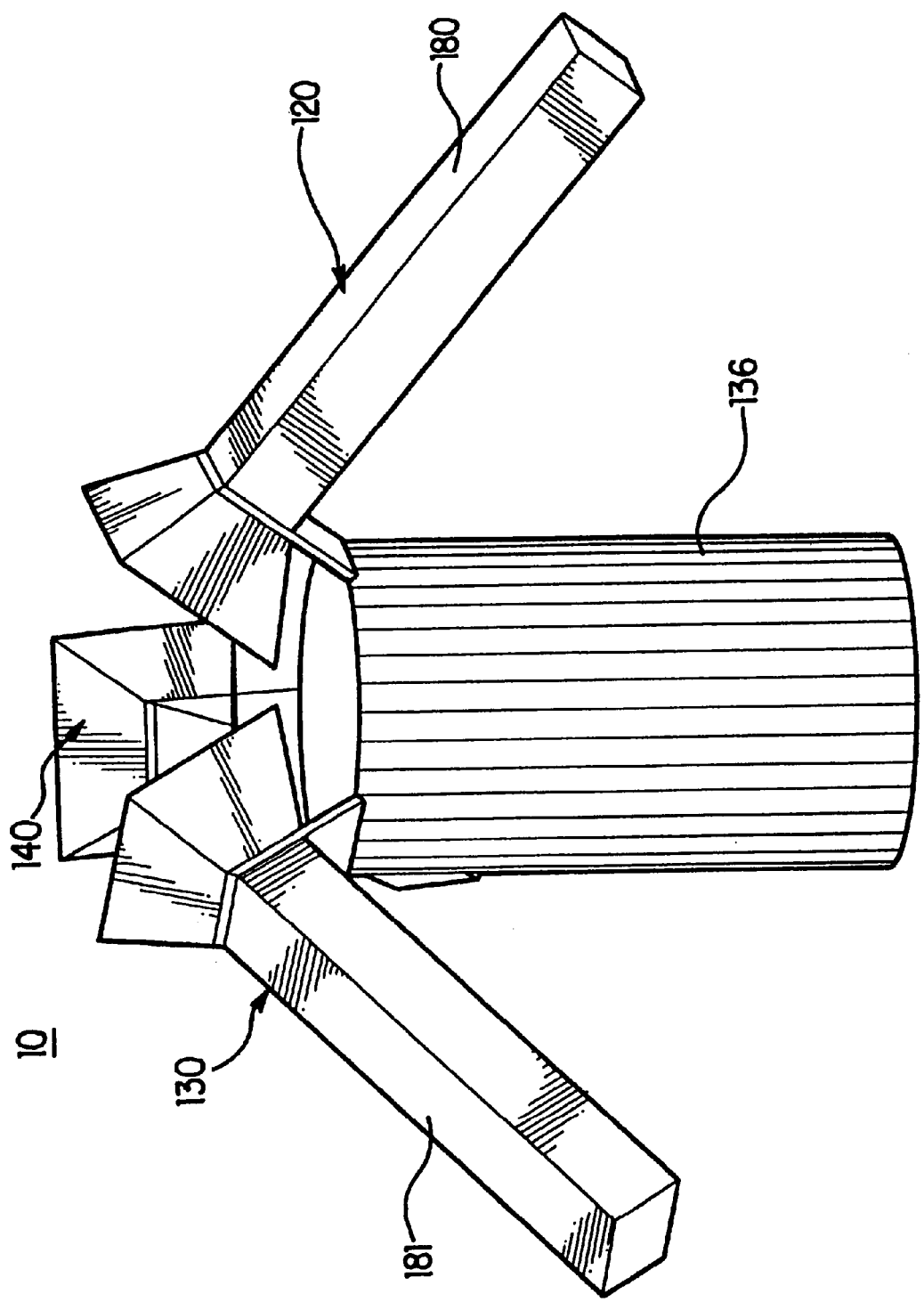
FIG. 8 shows an embodiment of a three-axis thruster set about a single controller.

FIG. 8 shows the three axis thruster set 10 with each axial thruster 120, 130 and 140 placed 120° from each other. This configuration shows that the-axial thrusters 120, 130, 140 may be configured to enable thrust in each of three orthogonal axes of the spacecraft when fired.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A thruster set for use in a spacecraft attitude control system comprising: three pulsed plasma thrusters, each having:
   an anode discharge electrode;
   a cathode discharge electrode; and
   spark plug for initiating discharge of the thruster;
   a common capacitor for storing energy;
   anode stripline coupling the common capacitor to the anode discharge clectrodes of the three thrusters and comprising sheet having three portions angled relative to each other and respectively connected to the anode electrodes the three thrusters;
   a cathode stripline coupling the common capacitor to the cathode discharge electrodes of the three thrusters and comprising a sheet having three portions angled relative to each other and respectively connected to the cathode electrodes of the three thrusters; and
   a discharge initiation circuit coupled to each spark plug for selectively firing a single selected thruster of the three thrusters so as to provide a thrust impulse bit from the selected thruster along an axis of the selected thruster.

2. The thruster set of claim 1 wherein there are no additional thrusters sharing the common capacitor and wherein the axes of the three thrusters are orthogonal.

3. The thruster set of claim 1 wherein said anode stripline sheet is copper and said cathode stripline sheet is copper.

4. The thruster set of claim 1 wherein:
   the anode stripline three portions are angled at 90 degrees relative to each other; and
   the cathode stripline three portions are angled at 90 degrees relative to each other.

5. The thruster set of claim 1 further comprising a conversion circuit for charging the common capacitor with energy from a power input from the spacecraft.

6. The thruster set of claim 5 wherein the energy is received in discrete quantities in a particular time interval.

7. The thruster set of claim 6 wherein the quantities of energy have a magnitude of between approximately 5 and 50 joules.

8. The thruster set of claim 6 wherein the time interval is between approximately 0.25 and 1.5 seconds.

9. The thruster set of claim 6 wherein for each of the three thrusters:
   a minimum impulse bit is between 10 $\mu$Ns and 100 $\mu$Ns; and
   a specific impulse is between 1000 sec. and 1200 sec.

10. An attitude control system for a spacecraft comprising:
    a plurality of thruster sets positioned about said spacecraft, to enable both translation and rotation of the spacecraft, each thruster set having a centerline and comprising:
    three thrusters, each having:
       an axis oriented orthogonal to the axis of each of the other two thrusters in the thruster set such that thrust may be provided in three orthogonal directions;
       an anode discharge electrode;
       a cathode discharge electrode; and
       a fuel bar;
       an energy storage device;
       an anode stripline coupling the energy storage device to the anode discharge electrode of each of the three thrusters and comprising a copper sheet having three portions an 90 degrees relative to each other and respectively connected to the cathode discharge electrodes of the three thrusters; and
       a cathode stripline coupling the energy storage device to the cathode discharge electrode of each of the three thrusters and comprising a copper sheet having three portions angled at 90 degrees relative to each other and respectively connected to the cathode discharge electrodes of the three thrusters.

11. The attitude control system of claim 10 wherein the energy storage device comprises a capacitor for storing energy and electrically connected to the anode and cathode discharge electrodes of each of the three thrusters so as to maintain substantially a common voltage across the anode and cathode discharge electrodes of each of the three thrusters.

12. The attitude control system of claim 10 wherein each fuel bar comprises ptolytetrafluoroethylene.

13. The attitude control system of claim 10 wherein there are exactly four thruster sets.

14. A thruster set for use in a spacecraft comprising: three pulsed plasma thrusters, each having:
    a fuel bar;
    an anode discharge electrode; and
    a cathode discharge electrode;
    a common capacitor for storing energy and electrically connected to the anode and cathode discharge electrodes of each of the three thrusters so as to maintain substantially a common voltage across the anode and cathode discharge electrodes of each of the three thrusters by:
    an anode stripline coupling the common capacitor to the anode discharge electrodes of the three thrusters and comprising a copper sheet having three portions angled at 90 degrees relative to each other and respectively connected to the anode electrodes of the three thrusters; and
    a cathode stripline coupling the common capacitor to the cathode discharge electrodes of the three thrusters and comprising a copper sheet having three portions angled at 90 degrees relative to each other and respectively connected to the cathode electrodes of the three thrusters; and
    a discharge initiation circuit for selectively filing a single selected thruster of the three thrusters so as to provide a thrust impulse bit from the selected thruster along an axis of the selected thruster.

15. The thruster set of claim 14 wherein there are three such thrusters and wherein said axis of each thruster is orthogonal to the axes of each of the other two thrusters and forms an angle of 54.73 degrees from a controller centerline of the thruster set.

* * * * *

UNITED STATES PATENT AND TRADEMARK OFFICE
CERTIFICATE OF CORRECTION

PATENT NO. : 6,173,565 B1
DATED : January 16, 2001
INVENTOR(S) : R. Joseph Cassady, Roger M. Myers, Robert D. Osborne It is certified that error appears in the above-identified patent and that said Letters Patent is hereby corrected as shown below:

Claim 1, column 5,
Line 27, "clectrodes" should read -- electrodes --.
Line 30, -- of -- should appear between "electrodes" and "the".

Claim 10, column 6,
Line 13, "an" should read -- angled at --.
Spanning lines 14-15, "cathode" should read -- anode --.

Signed and Sealed this

Second Day of October, 2001

Attest:

*Nicholas P. Godici*

NICHOLAS P. GODICI
*Attesting Officer*   *Acting Director of the United States Patent and Trademark Office*